United States Patent
Raman

(10) Patent No.: US 8,327,623 B2
(45) Date of Patent: Dec. 11, 2012

(54) METHOD AND SYSTEM FOR UTILIZATION OF REGENERATIVE BRAKING ELECTRICAL ENERGY FOR OPERATING AUXILIARY SYSTEM IN AN OFF-HIGHWAY VEHICLE

(75) Inventor: Venkatesh Raman, Karnataka (IN)

(73) Assignee: General Electric Company, Schenectady, NY (US)

( * ) Notice: Subject to any disclaimer, the term of this patent is extended or adjusted under 35 U.S.C. 154(b) by 246 days.

(21) Appl. No.: 12/646,302

(22) Filed: Dec. 23, 2009

(65) Prior Publication Data

US 2011/0061364 A1    Mar. 17, 2011

(51) Int. Cl.
*F01N 3/00* (2006.01)

(52) U.S. Cl. ............... 60/286; 60/274; 60/280; 60/297; 60/301; 60/303; 180/65.21; 180/65.51; 180/309; 903/930; 903/947; 105/35

(58) Field of Classification Search ............... 60/274, 60/280, 286, 295, 297, 300, 303, 311; 180/65.21, 180/65.31, 65.51, 309; 903/930, 947; 105/35, 105/54

See application file for complete search history.

(56) References Cited

U.S. PATENT DOCUMENTS

| 4,489,242 | A | 12/1984 | Worst |
| 4,774,811 | A | 10/1988 | Kawamura |
| 5,319,930 | A | 6/1994 | Shinzawa et al. |
| 5,323,868 | A | 6/1994 | Kawashima |
| 6,038,854 | A | 3/2000 | Penetrante et al. |
| 6,381,955 | B1 * | 5/2002 | Morganti et al. .......... 60/300 |
| 6,422,001 | B1 * | 7/2002 | Sherman et al. .......... 60/274 |
| 6,438,948 | B2 | 8/2002 | Ono et al. |
| 6,758,037 | B2 | 7/2004 | Terada et al. |
| 6,912,848 | B2 * | 7/2005 | Bedapudi .......... 60/297 |
| 7,028,793 | B2 * | 4/2006 | Hu et al. .......... 180/65.25 |
| 7,034,480 | B2 * | 4/2006 | Kumar et al. .......... 318/362 |
| 8,010,264 | B2 * | 8/2011 | Ogata et al. .......... 701/55 |

* cited by examiner

*Primary Examiner* — Binh Q Tran

(74) *Attorney, Agent, or Firm* — GE Global Patent Operation; John A. Kramer

(57) ABSTRACT

Electrical power from a dynamic braking process in an off-highway vehicle is used to power an auxiliary system in the vehicle. The auxiliary system may be a urea storage container heating unit or a particulate filter regeneration heating unit. When dynamic braking electricity is unavailable, and to the extent the dynamic braking electricity is insufficient for powering the auxiliary system, electrical power from an energy device on board the vehicle is used to power the auxiliary system. The energy device may be an auxiliary energy storage device, devoted for use in powering the auxiliary system.

16 Claims, 10 Drawing Sheets

METHOD AND SYSTEM FOR UTILIZATION OF REGENERATIVE BRAKING ELECTRICAL ENERGY FOR OPERATING AUXILIARY SYSTEM IN AN OFF-HIGHWAY VEHICLE

BACKGROUND OF THE INVENTION

Embodiments of the invention relate to rail vehicles and other off-highway vehicles. Other embodiments relate to electrical energy systems in such vehicles.

Many off-highway vehicles, especially railroad locomotives and other rail vehicles, utilize a diesel engine as a prime mover. In some instances, the diesel engine runs a generator or alternator, which produces electricity used for powering one or more traction motors in the off-highway vehicle. For example, a traction motor may be connected to a vehicle axle via a gear set for moving a wheel connected to the axle.

In a dynamic braking mode of operation, a traction motor is switched from a motoring motor (e.g., being supplied with electricity to rotate an output shaft of the motor) to a generator mode, e.g., rotation of the motor's output shaft (through momentum of the vehicle) results in the generation of electricity at the motor's electrical terminals. The electromagnetic resistance presented by the motor in the dynamic braking mode causes the off-highway vehicle to slow down, without the need to utilize the vehicle's pneumatic-mechanical braking system.

In certain vehicles, electricity generated during dynamic braking operations is stored in an energy storage system located on the vehicle. In many other vehicles, especially certain rail vehicles and other off-highway vehicles that are not equipped with high-capacity energy storage systems, electricity generated during dynamic braking operations is routed to a dynamic braking resistive grid, where it is turned into waste heat that is transferred to a passing airflow for dissipation into the atmosphere.

Dissipating dynamic braking electricity in a resistive grid as waste heat results in reduced levels of vehicle system performance, in terms of overall efficiency and energy use, since the energy captured during dynamic braking is wasted.

BRIEF SUMMARY OF THE INVENTION

These and other shortcomings of the prior art are addressed by the present invention, certain embodiments of which provide a method and apparatus for operating an auxiliary system in an off-highway vehicle using dynamic braking electricity.

One embodiment relates to a method for operating an auxiliary system in an off-highway vehicle, e.g., train, marine vessel, mining vehicles, construction vehicles, agriculture vehicles, or the like. The method comprises dynamically braking the vehicle so as to generate dynamic braking electricity, using a traction motor of the vehicle. At least one auxiliary system in the vehicle is powered with the dynamic braking electricity. ("Auxiliary" system refers to an electrically powered system in the vehicle that is not a traction system or part of a traction system, examples of which include traction motors or power inverters for powering a motor.) To the extent the dynamic braking electricity is insufficient to power the at least one auxiliary system, and when dynamic braking electricity is unavailable, the at least one auxiliary system is powered from an energy device in the vehicle. ("Insufficient" means there is not enough electrical power from dynamic braking to power the at least one auxiliary system at a desired/designated level of operability of the at least one auxiliary system; "energy device" refers to a device in a vehicle that provides electrical power, other than dynamic braking electrical power, such as an alternator/generator, or an auxiliary energy storage device or other energy storage device. An "auxiliary" energy storage device is a battery or other energy storage device that is not used to provide electrical power for traction purposes, e.g., powering traction motors.) To the extent the dynamic braking electricity exceeds electrical power requirements of the at least one auxiliary system, the dynamic braking electricity is dispersed in a dynamic braking resistive grid.

In another embodiment, the auxiliary system that is powered using the dynamic braking electricity is part of an engine emissions treatment system. In particular, the off-highway vehicle includes an engine emissions treatment system having a urea storage container that contains urea, and a urea storage container heating unit in thermal communication with a heat retaining material located proximate to the urea storage container. The urea storage container heating unit is powered with the dynamic braking electricity to heat the heat retaining material.

In another embodiment, the auxiliary system that is powered using the dynamic braking electricity is part of a particulate filter system. In particular, the off-highway vehicle includes a particulate filter disposed in fluid communication with an exhaust path of an engine of the vehicle, for filtering particulate matter from an exhaust gas flow of the engine, and a particulate filter regeneration heating unit positioned in the exhaust path. The particulate filter regeneration heating unit is powered with the dynamic braking electricity to heat the exhaust gas flow to a temperature sufficient to cause oxidation of particulate matter contained in the particulate filter.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
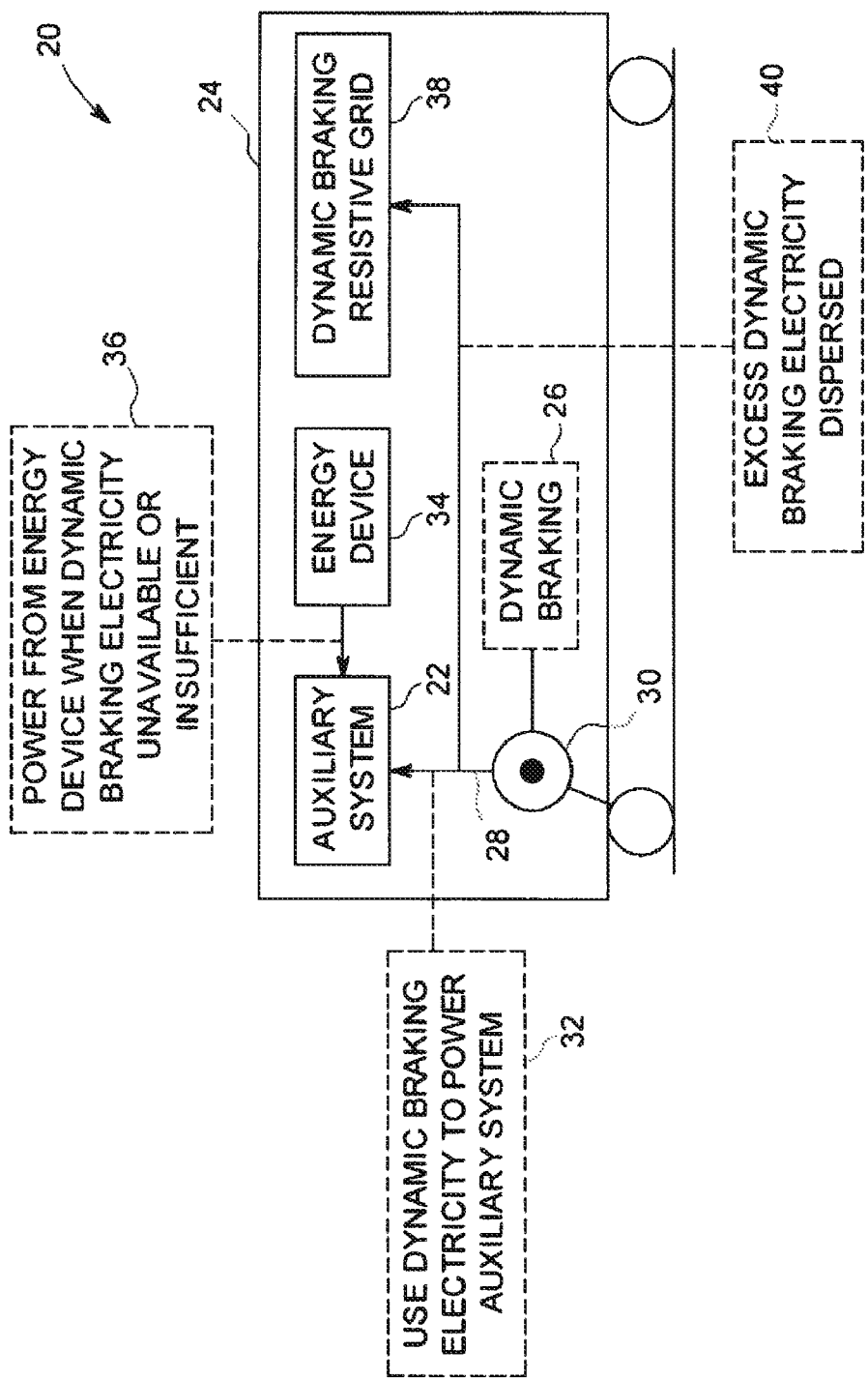
FIG. 1 is a schematic diagram of a method and system for operating an auxiliary system in an off-highway vehicle, according to an embodiment of the present invention.

Referring to the drawings wherein identical reference numerals denote the same elements throughout the various views, FIG. 1 is a schematic diagram of a method and system 20 for operating an auxiliary system 22 in an off-highway vehicle 24, according to an embodiment of the present invention. The method comprises dynamically braking the vehicle 24 (as at Step 26) so as to generate dynamic braking electricity 28, using a traction motor 30 of the vehicle 24. At least one auxiliary system 22 in the vehicle is powered with the dynamic braking electricity 28, as at Step 32. (As noted above, "auxiliary" system refers to an electrically powered system in the vehicle that is not a traction system, e.g., traction motor or power inverters for powering a motor.) To the extent the dynamic braking electricity is insufficient to power the at least one auxiliary system 22, and when dynamic braking electricity is unavailable, the at least one auxiliary system 22 is powered from an energy device 34 in the vehicle, as at Step 36. To the extent the dynamic braking electricity 28 exceeds electrical power requirements of the at least one auxiliary system 22, the dynamic braking electricity is dispersed in a dynamic braking resistive grid 38, as at Step 40.

Figure 2:
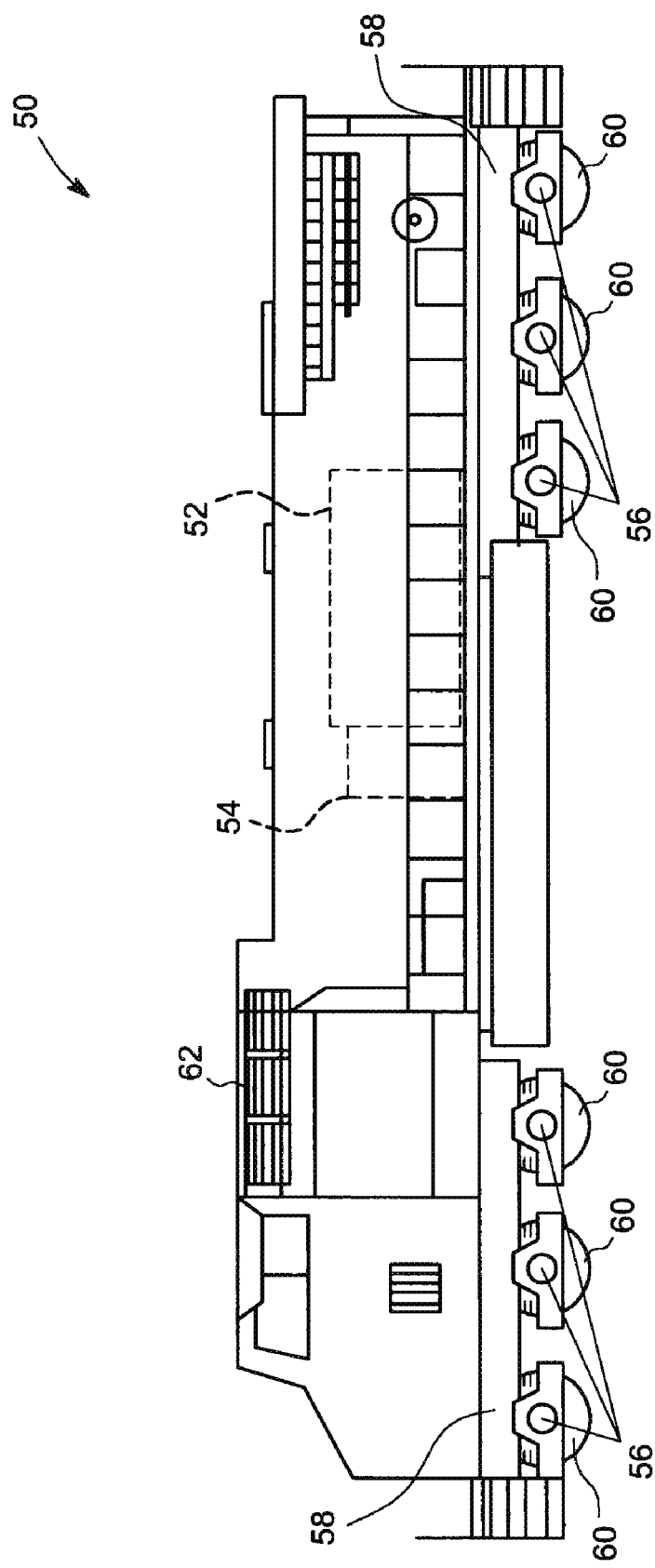
FIG. 2 is a schematic side view of a locomotive incorporating the system for operating an auxiliary system, according to another embodiment of the present invention, for diesel particulate filter regeneration.

The off-highway vehicle 24 may be a railroad locomotive. FIG. 2 depicts an exemplary railroad locomotive 50 constructed according to an aspect of the present invention. The locomotive 50 includes a combustion engine 52, specifically a diesel engine, which drives an alternator 54. The alternator provides AC electrical power to traction motors 56 (not illustrated in detail, mounted in bogies 58). The traction motors 56 are mechanically coupled to wheels 60. This type of drivetrain is often referred to as a "series hybrid" system.

While a locomotive 50 using an AC drive system is described herein, it should be noted that the principles of the present invention may be applied to other drivetrain configurations, e.g., those using an alternator or DC generator as a power source, and using AC or DC traction motors. Accordingly, as used herein the term "electrical power generator" refers to any electrical machine which coverts mechanical energy to electrical energy. Furthermore, the principles of the present invention are also applicable to other types of vehicles, such as on- or off-highway vehicles. The vehicle may use any type of element adapted to exert a tractive force. Examples of tractive elements include wheels, axles, or translating or reciprocating structures. The term "traction motor" could encompass, for example, electric or hydraulic linear motors or actuators.

Figure 3:
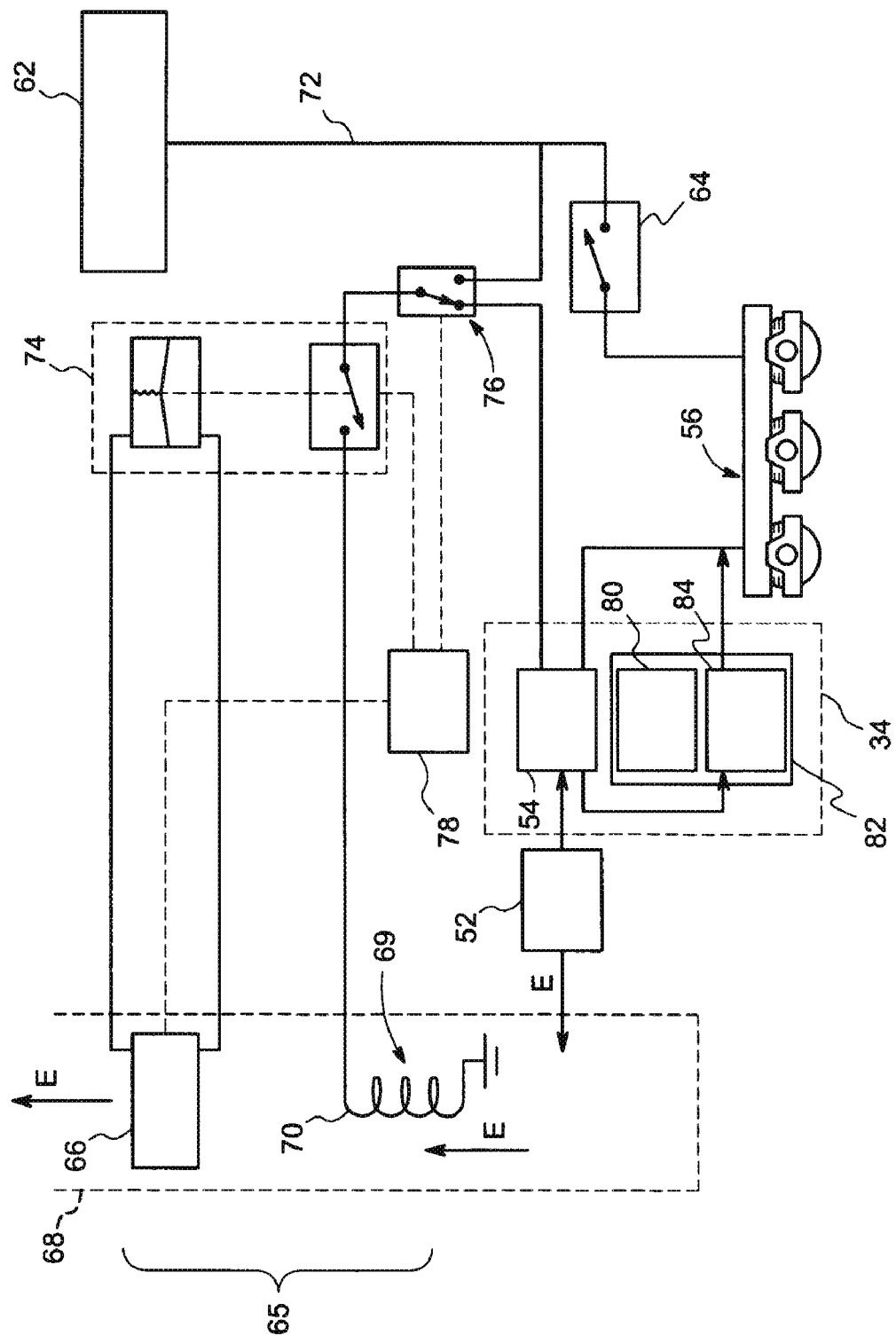
FIG. 3 is a schematic view showing the portions of the system for operating an auxiliary system of FIG. 2.

FIGS. 2 and 3 illustrate the functional components of the locomotive 50 schematically. A dynamic braking resistive grid 62 is provided, or more than one such grid, each of which comprises one or more resistors electrically interconnected to one another to effectively convert electrical power into heat. For example, a dynamic braking resistive grid may comprise a plurality of chains or strings of resistors, such as resistors having a high power capacity and relatively low resistance, connected in series and/or parallel. (The grid may comprise a plurality of strings of series-connected resistors, with the plural strings being connected in parallel.) The dynamic braking resistive grid 62 is selectively connectable (e.g., through a switch 64) to the traction motors 16, to dissipate power generated by the traction motors 56 and thereby provide dynamic braking (also sometimes referred to as "retard effort") for the locomotive 50. That is, the traction motors are operated in a dynamic braking mode, wherein the traction motors act as electrical generators, and electrical power generated by the traction motors in this mode of operation is dissipated in the resistive grid(s). The resistive grid 62 may be mounted near the exterior of the locomotive 50 and may be cooled, for example using a forced air flow.

The engine 52 is equipped with a particulate filter system 65 having at least one diesel particulate filter ("DPF") 66 of a known type. The DPF 66 is positioned in fluid communication with an exhaust path 68 of the engine 52. As used herein, the term "exhaust path" refers to a path defined by ducts, piping, or other similar components, which serves to channel exhaust gases, shown generally by arrows "E", from the engine 52 to the atmosphere. It will be understood that the exhaust path 68 may contain elements such as mufflers or silencers, NOx reduction devices and other pollution control devices, and so forth. The lateral boundaries of the exhaust path 68 are shown schematically by dotted lines in FIG. 3. Typically, the DPF 66 contains a honeycomb structure (not shown) with alternate channels plugged at opposite ends. The diesel exhaust gases pass through the open end of a channel. At the opposite end is a plug that forces the gases through the porous channel wall, allowing the exhaust to escape through the neighboring channel, while trapping as much as ninety percent of the solid particle matter (i.e., "soot"). The DPF may be located within a conventional "coffin muffler" (not shown) which is typically mounted directly to the engine 52.

In an embodiment, the auxiliary system that is powered using the dynamic braking electricity 28 is part of the particulate filter system 65. In particular, in addition to the DPF 66, the particulate filter system 65 further comprises a particulate filter regeneration heating unit 69 positioned in the exhaust path. The particulate filter regeneration heating unit 69 is powered with the dynamic braking electricity to heat the exhaust gas flow E to a temperature sufficient to cause oxidation of particulate matter contained in the DPF 66.

The particulate filter regeneration heating unit 69 may comprise an electrical heating element 70 that is positioned in the exhaust path 68 upstream of the DPF 66. The unit 69 may further comprise support circuitry or other elements for operating the heating element 70, such as fuses, temperature sensors, other safety equipment, and the like. In one embodiment, the heating element 70 is positioned in close proximity to the DPF 66 so as to minimize heat losses. The physical configuration of the heating element 70 may take a variety of shapes and sizes such as coils, wire grids, bars, etc. The heating element 70 may also take the form of a plurality of individual heating elements.

The heating element 70 is supplied with electrical power from the traction motors 56. In the specific example illustrated, a line 72 couples the resistive grid 62 to the traction motors 56 and is electrically energized when dynamic braking is taking place (i.e., when the traction motors 56 are generating electrical current). Electricity from the line 72 is re-routed to the particulate filter regeneration heating unit 69, e.g., using a switch 76, which energizes the heating element 70 for emitting heat. This heating, using energy that would normally be dissipated to the atmosphere by the resistive grid 62, causes soot burn-out and regenerates the DPF 66 without the need for additional fuel.

Diesel particulate matter combusts when temperatures above about 600° C. (1100° F.) are attained. This temperature can be reduced to somewhere in the range of 350° C. (660° F.) to 450° C. (840° F.) by use of a fuel-borne catalyst. The actual temperature of soot burn-out will depend on the chemistry employed. The start of combustion causes a further increase in temperature. In some cases, in the absence of a fuel borne catalyst, the combustion of the particulate matter can raise temperatures above the structural integrity threshold of the filter material, which can cause catastrophic failure of the filter substrate. Many diesel engines run above 15% oxygen in the exhaust path 68 upstream of the DPF 66. While the amount of available oxygen makes fast regeneration of a filter possible, it also contributes to potential runaway regeneration problems.

Accordingly, to control the regeneration process, means may be provided for automatically cycling the heating element 70. In the illustrated example, a pressure-sensitive switch 74 (shown schematically) measures the pressure differential across the DPF 66 (e.g., inlet pressure minus outlet pressure). The switch 74 is part of an electrical circuit (first electrical circuit) that supplies current to the heating element 70 when the switch is closed. A differential pressure higher than a first preselected value (referred to as an "upper limit") indicates excessive loading of the DPF 66, which requires regeneration to lower the particulate level. A differential pressure lower than a second preselected value (referred to as a "lower limit") indicates low loading of the DPF 66, a condition in which regeneration may not be desirable and may be wasteful of fuel and/or harmful to the longevity of the DPF structure. Therefore, in an embodiment, the switch 74 is configured in such a way that the heating element electrical supply circuit will be closed whenever the differential pressure is above the upper limit (i.e., a closed circuit, meaning the heating element receives electricity) and open whenever the differential pressure is below the lower limit (i.e., an open circuit condition, meaning the heating element does not receive electricity). Depending on the particular application, there may be a significant difference between the upper and lower limits, or only a single limit may be used. That is, in one embodiment, the second preselected value is lower than the first preselected value. In another embodiment, the two preselected values are the same, so that regeneration is carried when the differential pressure is above the preselected value but not when the differential pressure is below the preselected value. The use of spread-apart limits, commonly referred to as hysteresis or "deadband", may be incorporated to prevent "hunting" (i.e., excessive cycling) of the heating element 70.

It may be necessary or desirable to regenerate the DPF 66 when dynamic braking is not active, and/or to the extent dynamic braking electricity is insufficient to power the particulate filter regeneration heating unit 69 for a desired level of heating of the heating element 70. In one embodiment, a separate switched electrical circuit 76 (second electrical circuit) is used to couple the particulate filter regeneration heating unit 69 to an energy device 34 in the vehicle when dynamic braking is not being used, and when dynamic braking is being used by the amount of electrical power produced by the braking operation is insufficient to power the particulate filter regeneration heating unit 69. "Energy device" refers to a device in a vehicle that provides electrical power, other than dynamic braking electrical power, such as an alternator/generator 54, or an auxiliary energy storage device 80 or other energy storage device 82. An "auxiliary" energy storage device 80 is a battery or other energy storage device that is not used to provide electrical power for traction purposes, e.g., powering traction motors the alternator 14 instead of the traction motors 16, in contrast to a primary energy storage device 84 that is used to provide electrical power for traction purposes.

In one embodiment, the particulate filter regeneration heating unit 69 is selectively powered using electrical power from dynamic braking, to the extent such power is available, and from an energy storage device 82 otherwise. This ensures that the particulate filter regeneration heating unit 69 can be powered regardless of the operational status of other energy devices in the vehicle. For example, an alternator 54 may not necessarily be operational at all times when power (other than dynamic braking power) is required for powering the particulate filter regeneration heating unit 69. In another embodiment, the particulate filter regeneration heating unit 69 is selectively powered using electrical power from dynamic braking, to the extent such power is available, and from an auxiliary energy storage device 82 otherwise. In other words, in this embodiment the particulate filter regeneration heating unit 69 does not receive power from a primary energy storage device 84. This ensures that the particulate filter regeneration heating unit 69 can be powered regardless of the charge or other status of the primary energy storage device(s) in the vehicle. For example, due to traction demands, there may be times when a primary energy storage device does not have sufficient excess electrical power capacity to power auxiliary system loads (such as the particulate filter regeneration heating unit 69) in addition to its traction demands. In an embodiment, the auxiliary energy storage device 82 is dedicated for use in providing electrical power to the particulate filter regeneration heating unit 69.

While the switch 74 and other circuits are shown as electromechanical devices, any hardware capable of performing the various switching functions may be substituted therefor. For example, pressure measurements (e.g., sensed using one or more pressure sensors) may be provided to an electronic or computerized controller, which compares the measurements to the predetermined limits and commands the heating element 70 to cycle on and off accordingly. As an example, FIG. 3 illustrates schematically a controller 78 having operative connections to the DPF 66, pressure switch 74, and switched circuit 76. It will be understood that vehicles such as the locomotive 50 frequently carry one or more on-board computers for various control purposes, and the regeneration method described herein may be implemented as software running on an existing on-board computer.

Figure 4:
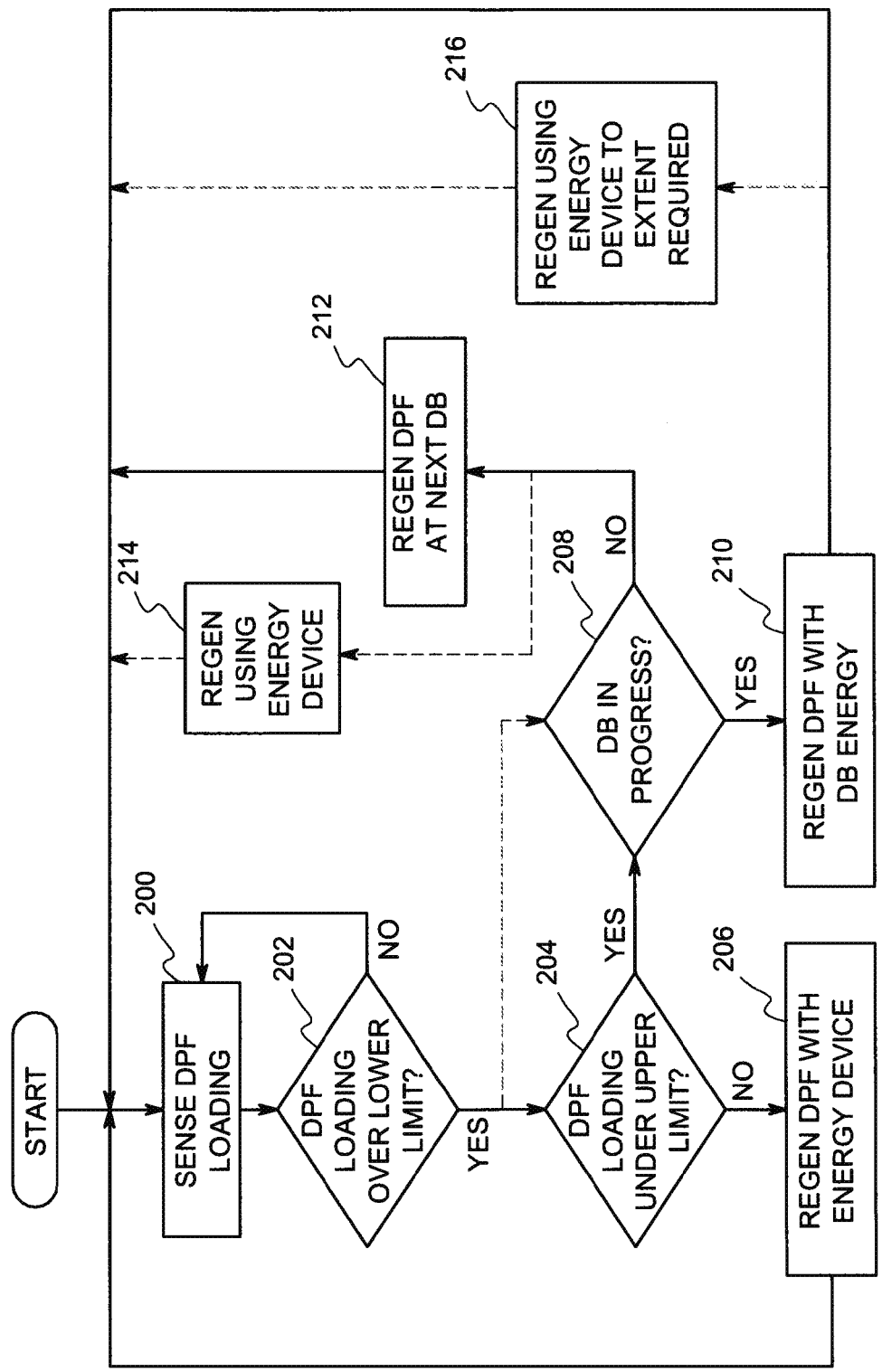
FIG. 4 is a flow chart depicting control logic for a method for operating an auxiliary system in an off-highway vehicle, according to an embodiment of the present invention, for diesel particulate filter regeneration.

FIG. 4 illustrates an example of a possible control strategy for implementing the DPF regeneration process. At block 200, the DPF loading is determined by sensing the differential pressure across it, as described above. At block 202, if the DPF loading is below a lower limit, no action is taken and the process cycles back to block 200. If the DPF loading is over the lower limit, then the upper limit is tested at block 204. If the DPF loading is over the upper limit, then the DPF is regenerated (block 206) using the particulate filter regeneration heating unit 69 as powered by the energy source 34, and the process cycles back to block 200. If, at block 204, the DPF loading is less than the upper limit, the controller 78 (or other suitable device) determines if dynamic braking is currently in progress at block 208. If it is, then the DPF 66 is regenerated using the particulate filter regeneration heating unit 69 powered by the traction motors 56 (block 210), and the process cycles back to block 200. If at block 208, dynamic braking is not in progress, the controller 78 schedules a DPF regeneration process for the next time dynamic braking is used. The process then cycles back to block 200. As should be appreciated, in this embodiment the DPF is regenerated at block 206, using power from the energy device 34 (e.g., alternator, or auxiliary energy storage device or other storage device), to ensure that the DPF is regenerated based on the loading of the DPF being above the upper limit, that is, the loading is deemed significant enough to require immediate regeneration. On the other hand, if the level of DPF loading is above the lower limit but below the upper limit, indicating, for example, moderate loading, then the DPF is regenerated using dynamic braking energy, when next available.

FIG. 4 further shows an alternative control strategy, indicated by the dashed lines, which represent control path deviants. More particularly, in this embodiment, if the level of DPF loading is over the lower limit, as determined at block 202, it is next determined if dynamic braking is in progress, as at block 208. If not, the DPF is regenerated by powering the particulate filter regeneration heating unit 69 with electrical energy from the energy device 34, e.g., auxiliary energy storage device, as at block 214. If dynamic braking is in progress, the DPF is regenerated by powering the particulate filter regeneration heating unit 69 with dynamic braking electricity, as at block 210, and by powering the particulate filter regeneration heating unit 69 with electrical power from the energy device 34, as at block 216, to the extent required if the dynamic braking electrical power is insufficient for powering the particulate filter regeneration heating unit 69. Alternatively, it may be determined if the dynamic braking electrical energy is sufficient for powering the particulate filter regeneration heating unit 69, and, if not, the particulate filter regeneration heating unit 69 is powered using the energy device 34 only.

Figure 5:
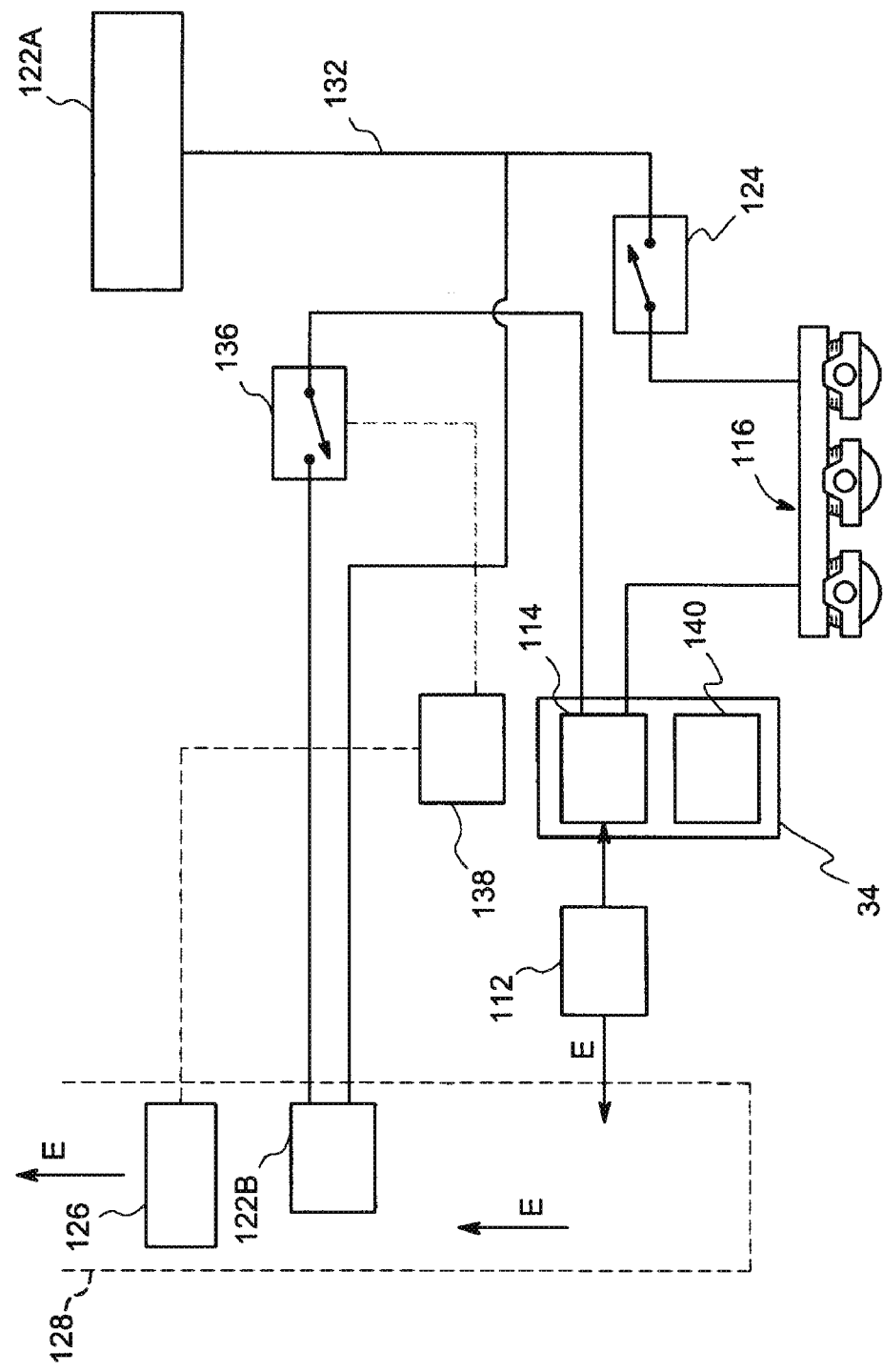
FIG. 5 is a schematic view showing another embodiment of the system for operating an auxiliary system in an off-highway vehicle, for diesel particulate filter regeneration.

FIG. 5 illustrates an alternative arrangement for a locomotive similar in construction to the locomotive 50 and having an engine 112, alternator 114, traction motors 116, DPF 126 in an exhaust path 128, and electronic controller 138. Two resistive grids 122A, 122B are provided which may be selectively connected (e.g., through switch 124) to the traction motors 116 to dissipate power generated by the traction motors 116 during dynamic braking. The two resistive grids 122A, 122B can be conceptualized as a single resistive grid (with a sufficient capacity for dynamic braking of the vehicle) that is physically "split" to form the two grids 122A, 122B, with the first resistive grid 122A being located in a conventional location, and the second resistive grid 122B being positioned in the exhaust path upstream of the DPF 126, remote from the first set 122A. The second resistive grid 122B may be positioned in close proximity to the DPF 126 so as to minimize heat losses.

The second resistive grid 122B is coupled to the traction motors 116 by the same circuit 132 that supplies the first resistive grid 122A. Therefore, the second resistive grid 122B is electrically energized whenever dynamic braking is taking place. Upon being electrically energized, the resistive grid 122B becomes heated and emits heat into the exhaust path 128. This heating, using energy that would otherwise be dissipated to the atmosphere by the first resistive grid 122A, causes soot burn-out and partially regenerates the DPF 126 in an essentially uncontrolled fashion upon every dynamic braking event. The controller 138 (or other appropriate control hardware) may be programmed or configured to terminate or prevent operation of the second resistive grid 122B if the pressure drop across the DPF 126 does not warrant regeneration. This limitation may also be used to protect the DPF 126 from a runaway regeneration reaction.

It may be necessary or desirable to regenerate the DPF 126 when dynamic braking is not active. Accordingly, an optional separate switched circuit 136 may be used to couple the second resistive grid 122B to an energy device 34 (such as an auxiliary energy storage device or other energy storage device 140, or an alternator 114). Cycling of the circuit 136 may be controlled based on pressure drop across the DPF 126 as described above with respect to FIG. 4, using the controller 138.

In another embodiment, instead of two resistive grids 122A, 122B, the sole dynamic braking resistive grid for the vehicle is disposed in the exhaust path.

Figure 6:
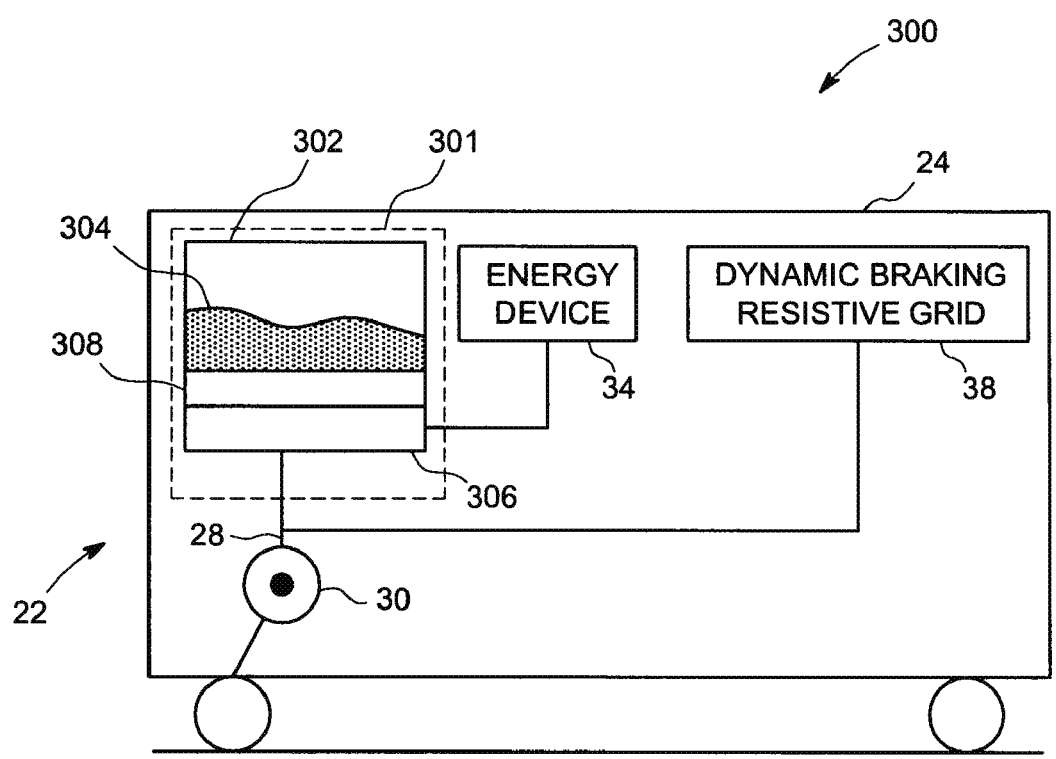
FIG. 6 is a schematic diagram of a system for operating an auxiliary system in an off-highway vehicle, according to an embodiment of the present invention, for heating urea in an engine emissions treatment system.

With reference to FIG. 6, another embodiment relates to a system and method 300 for utilization of dynamic braking electricity to operate an engine emissions treating system 301 (which, as should be appreciated, is one type of an auxiliary system 22) in an off-highway vehicle 24. In particular, the off-highway vehicle 24 includes an engine emissions treatment system 301 having a urea storage container 302 that contains urea 304, and a urea storage container heating unit 306 in thermal communication with a heat retaining material 308 located proximate to the urea storage container 302. The urea storage container heating unit 306 is powered with the dynamic braking electricity 28 to heat the heat retaining material 308. In another embodiment, the urea storage container heating unit 306 is powered from electrical power provided by an energy device 34, such as an auxiliary energy storage device, when dynamic braking electricity is unavailable, and to the extent that available dynamic braking electricity is insufficient for powering the urea storage container heating unit 306 to a desired level of heat output for heating the urea 304.

To explain further, certain off-highway vehicles include an engine emissions treatment system 301 that utilizes urea 304 for NOx reduction, that is, the urea is used as part of a controlled chemical process for reducing NOx from an engine exhaust stream. For this process, urea 304 must be maintained in a liquid state (−10 deg C. to 60 deg C.). Typically, urea is heated using energy supplied (directly or indirectly) from combusting fuel, which results in reduced vehicle efficiency and increased operational costs, due to the additional fuel required for heating urea for emissions treatment purposes.

The urea-based portion of the engine emissions treatment system may use a standard chemical process for emissions treatment. For example, it may be a selective catalytic reduction process, wherein liquid urea is converted to ammonia ($NH_3$). When the ammonia is mixed with NOx, it produces nitrogen ($N_2$) and water, which are expelled from the vehicle as harmless waste products. (In an embodiment, such a chemical process is in addition to the diesel particulate filter, which could also be considered part of the emissions treatment system.)

Figure 7:
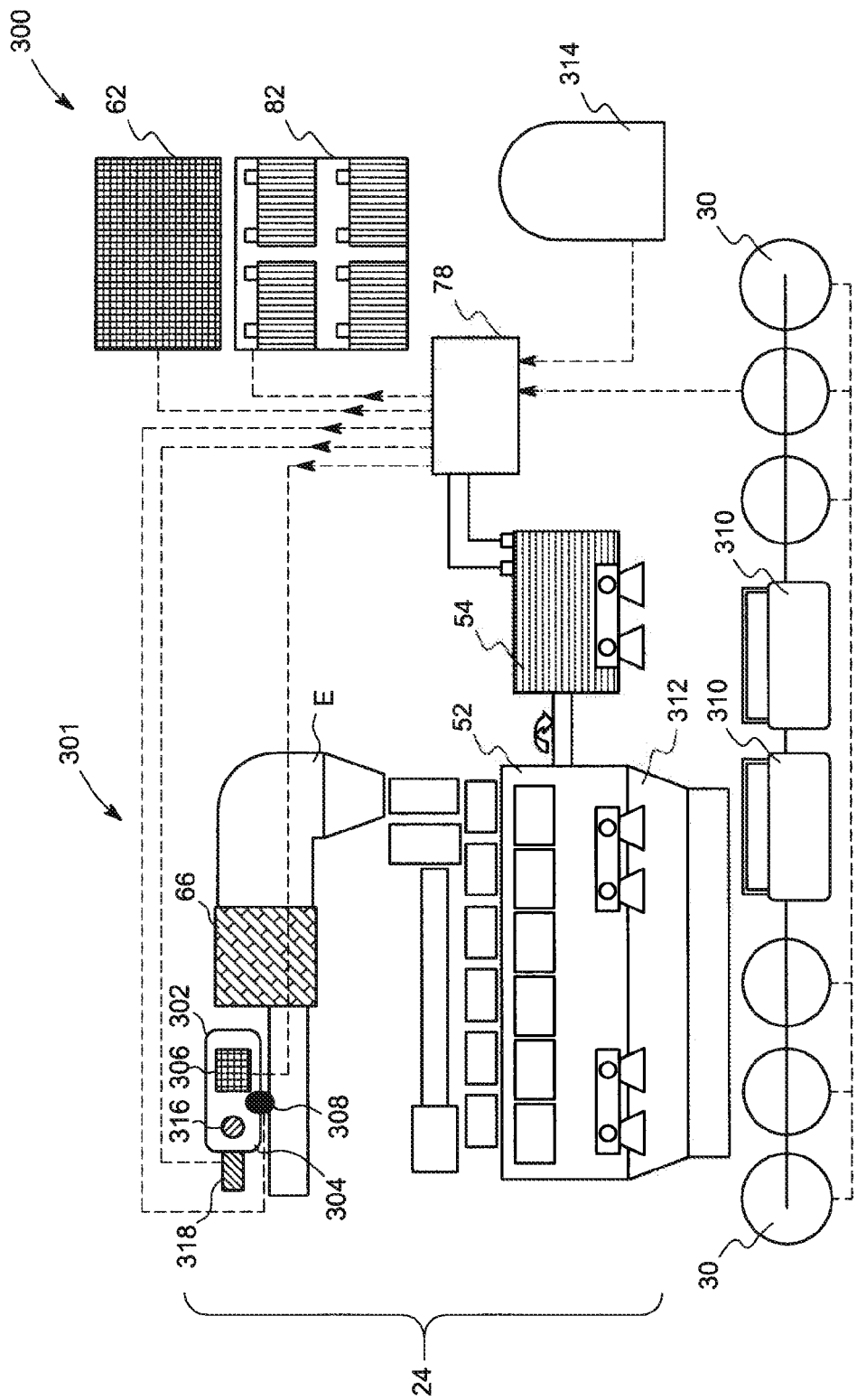
FIGS. 7-8 shows additional embodiments of the system of FIG. 6.
Figure 8:
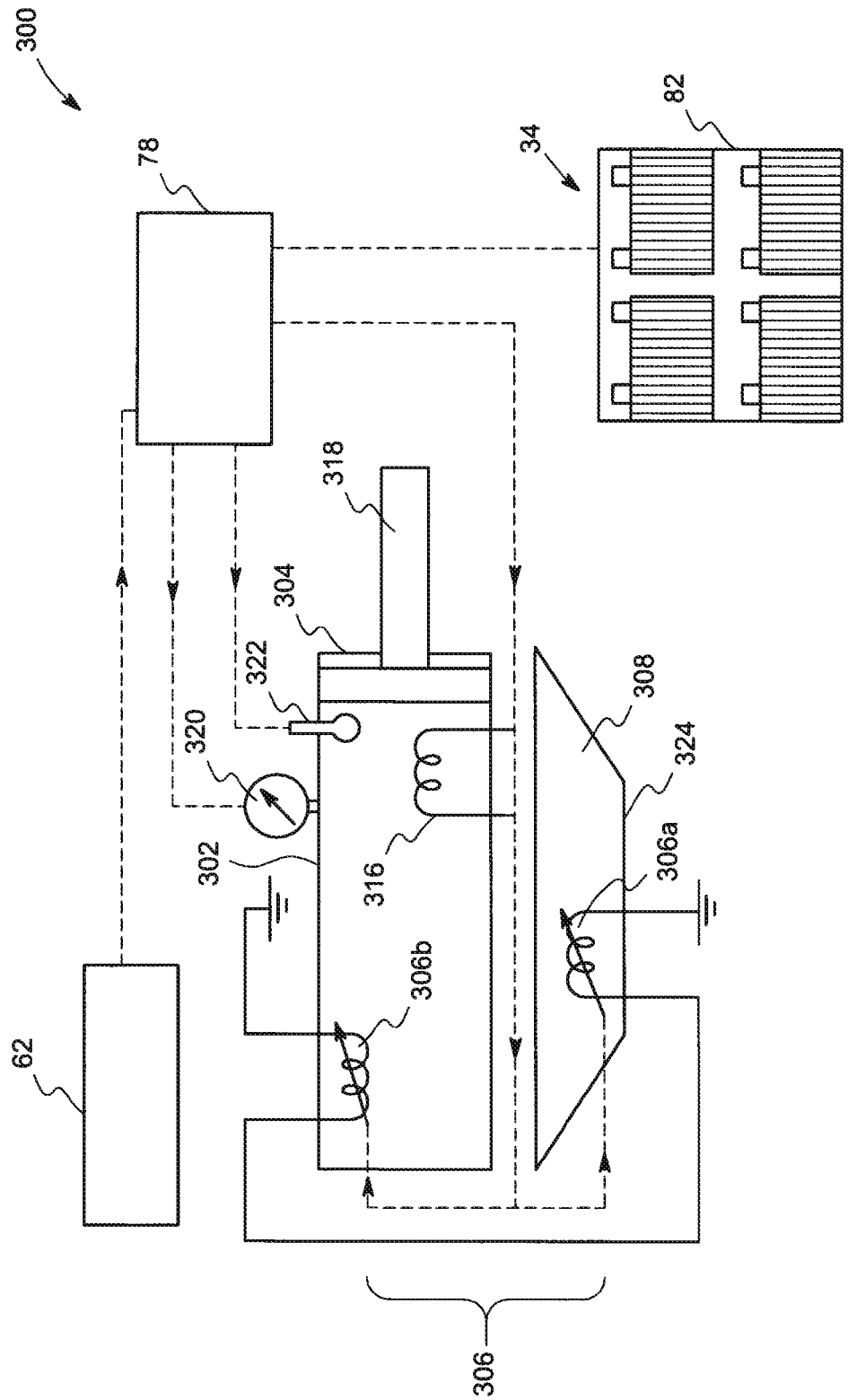

FIGS. 7 and 8 show another embodiment of the system 300 for utilization of dynamic braking electricity to operate an engine emissions treating system 301 in an off-highway vehicle 24. As with the off-highway vehicles shown in the other figures, the off-highway vehicle 24 in FIG. 7 includes an engine 52, a generator or alternator 54, traction motors 30, a dynamic braking resistive grid 62, a diesel particulate filter 66, and a controller or other control system 78. Other illustrated components, which are typically found in a vehicle system, include fuel tanks 310, an engine lubrication system 312, and a coolant system 314. In operation, the engine 52 is operated to combust fuel provided from tanks 310, with the mechanical output of the engine being used to drive the alternator 54. Electrical power produced by the alternator 54 is used to power the traction motors 30 for moving the vehicle 24. As a byproduct of combusting fuel, the engine 52 produces an exhaust stream E. The exhaust stream E is channeled through an exhaust system, which includes the diesel particulate filter 66 (e.g., as described above) and the engine emissions treatment system 301. The treatment system 301 is configured for carrying out a urea treatment process, and for this purpose includes a urea storage tank or other container 302, urea 304 contained in the tank, and a urea storage container heating unit 306 in thermal communication with a heat retaining material 308 located proximate to the urea storage container 302. The urea storage container heating unit 306 includes a first heater 306a positioned in or proximate to the heat retaining material 308, and may further include a second heater 306b positioned in or proximate to the urea 304. (The second heater 306b may be, for example, an immersion heater.) The system 301 may further include a urea cooling system 316, a pressure actuating device 318, a pressure sensing device 320, and a temperature sensing device 322 (discussed in more detail below). The pressure sensing device 320 is operably connected to the container 302 for sensing the pressure within the container. The temperature sensing device 322 is operably connected to the container 302 for sensing the temperature of urea 304 within the container 302.

The heat retaining material 308 is placed in an insulated pan or other insulated container 324 that abuts the urea storage container 302. For example, the insulated container 324 may be positioned below the urea storage container 302. The first heater 306a of the urea storage container heating unit 306 is positioned inside the insulated container 324, for heating the heat retaining material 308. The heat retaining material 308 is configured, by virtue of its material properties selected for this purpose, to absorb heat radiated from the heater 306a and to gradually re-emit the absorbed heat over time. This provides for a greater degree of heating efficiency, and for a more even and prolonged application of heat energy to the urea 304. Examples of suitable heat retaining materials include sand, gravel or other stones, certain types of ceramic chips, heavy oils, and molten salt. The insulated pan or other insulated container is insulated to reduce heat losses and to retain heat longer. The junction between the insulated container 324 and the urea storage container 302 may be left non-insulated, or with reduced insulation, to provide for efficient and directed heat transfer between the heat retaining material 308 and the urea 304 in the urea storage container 302.

In an embodiment, the control system 78 is configured to control operation of the urea storage container heating unit 306 similar to the control scheme shown in FIG. 4. Here, the control system 78 receives a temperature sensing signal from the temperature sensing device 322, which is indicative of the temperature of the urea 304 within the urea storage container 302, as at block 200. At block 202, the control system 78 determines if the temperature of the urea is above a desired minimum temperature, such as a minimum temperature where the urea is liquid, or a threshold above but near such a minimum temperature. (The threshold would be selected to account for the time required to heat the urea, to avoid the situation where the urea ever falls below the minimum temperature.) If so, control flow cycles back to block 200 to continue monitoring the temperature. If not (e.g., if the temperature is too low), the process continues as at block 208, except that the electrical power from dynamic braking (to the extent available and sufficient) or from an energy device is used to power the urea storage container heating unit 306. Such a process may utilize steps equivalent to steps/blocks 210, 212, or steps equivalent to steps/blocks 214, 216, similar to as described above.

In another embodiment, in addition to powering the urea storage container heating unit 306 using dynamic braking electricity, the system 300 controls a pressure within the urea storage container 302 (e.g., for varying the boiling point of the liquid urea), and/or controls the urea cooling system 316 for cooling urea 304 within the urea storage container 302, when such cooling is required. In particular, the control system 78 is configured to monitor the respective temperatures of the urea and/or heat retaining material, and to control application of electrical power to the urea storage container heating unit 306, as supplied from a dynamic braking operation (when available and to the extent sufficient) or from an energy device otherwise, to maintain the temperature of the urea 304 and/or heating retaining material 308 above desired minimum levels. The control system 78 may be further configured to monitor the pressure within the urea storage container, to control and vary the pressure using the pressure actuating device 318, and to map the pressure and temperature of the urea to optimize a heating and cooling strategy for the urea.

Figure 9A:
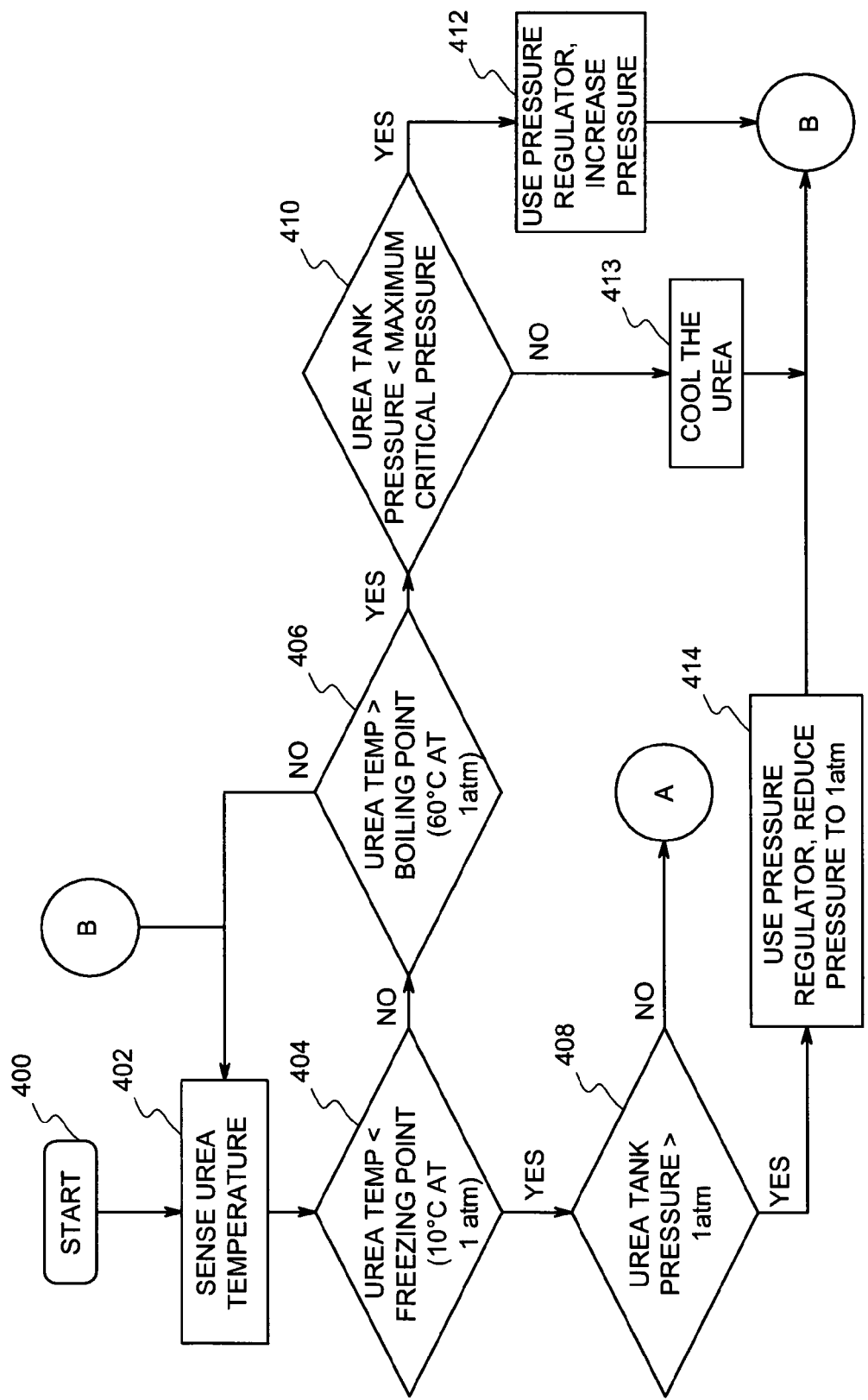
FIGS. 9A and 9B are flowcharts showing an embodiment of a control strategy or control flow for the system of FIGS. 6-8.
Figure 9B:
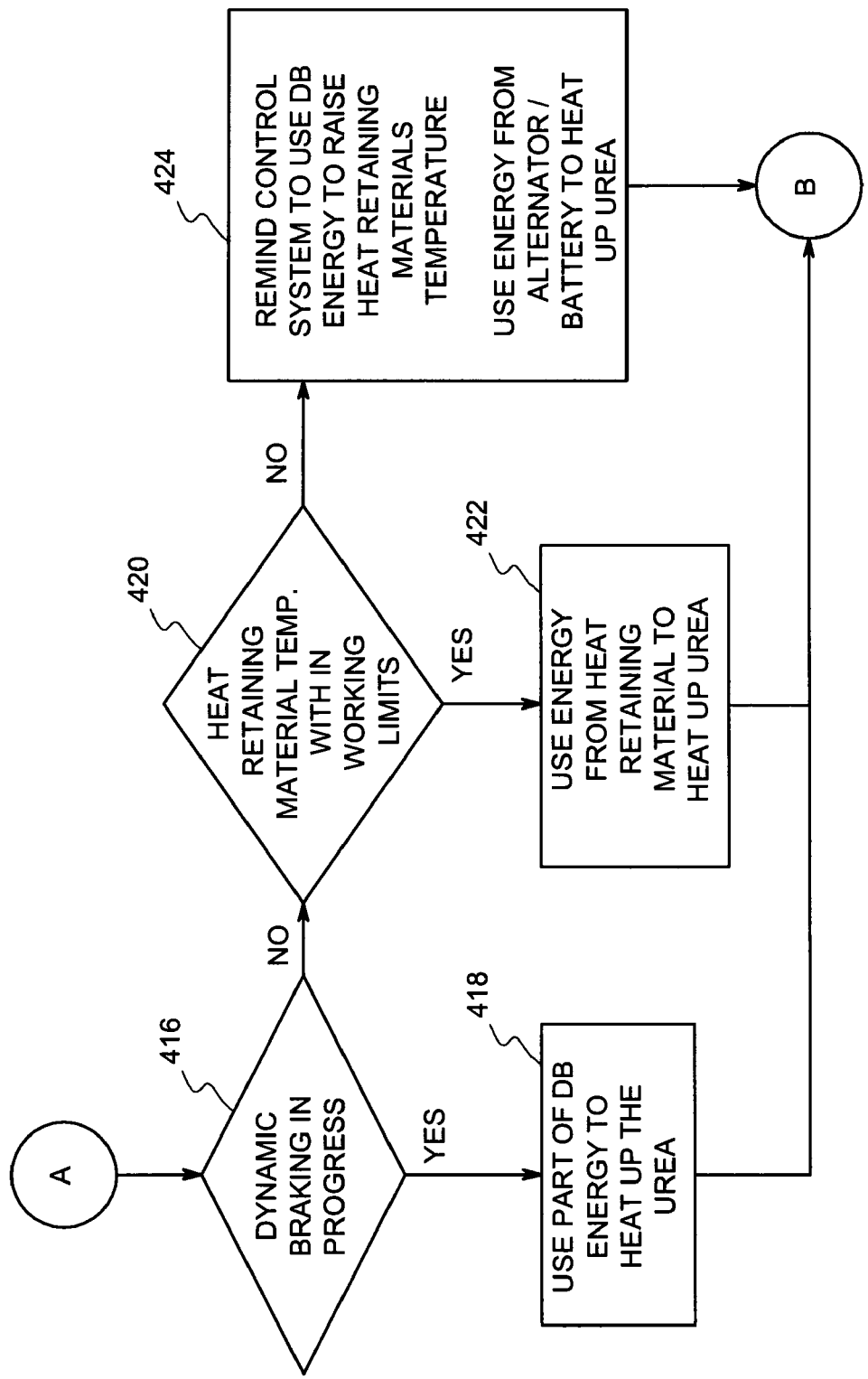

FIGS. 9A and 9B are flowcharts showing an embodiment of a control strategy or control process for the system 300. The process of FIGS. 9A and 9B may be implemented using the control system 78 as a control agent, via suitable programming instructions provided to the control system 78, as stored in a memory unit or otherwise. The process starts at block 400. At block 402, the current temperature of the urea 304 in the container 302 is sensed. In particular, the temperature sensing device 322 senses the current temperature of the urea 304 in the container 302 (on an ongoing basis, periodically, or upon request), and outputs a signal indicative of the sensed temperature. This signal is received at the control system 78, which is configured to extract the sensed current temperature from the signal output by the temperature sensing device 322. At block 404, the control system assesses whether the temperature of the urea is below a first designated temperature, such as the freezing point of urea at the pressure within the container 302 or at another designated pressure (e.g., <10 deg C. at 1 atmosphere pressure). If not, the process continues at block 406. If so, the process continues at block 408.

At block 406, the control system 78 determines if the temperature of the urea 304 is above a second designated temperature, such as the boiling point of urea at the pressure within the container 302 or at another designated pressure (e.g., >60 deg C. at 1 atmosphere pressure). If not, this indicates that the urea is liquid, as being above the freezing point (first designated temperature) and below the boiling point (second designated temperature), and the process returns to block 402. If so, the process continues at block 410, with a determination of whether the pressure within the urea storage container 302 is below a first designated pressure of the urea storage container 306. The first designate pressure may be, for example, a maximum critical pressure of the urea storage container, that is, the maximum rated internal pressure that the urea storage container is able to withstand. ("Rated" pressure means a pressure below the fail point of the urea storage container, as a safety margin.) Pressure information is provided from the pressure sensing device 320, which senses the current pressure within the urea storage container 302 (on an ongoing basis or otherwise) and outputs a signal indicative of the sensed pressure. If the pressure is below the maximum critical pressure (meaning the urea storage container is able to accommodate additional internal pressure), the process continues at block 412. Here, the control system 78 controls the pressure actuating device 318 to increase the pressure within the container 302. The pressure actuating device 318 may be, for example, a piston-type device that can be moved to change the effective volume within the urea storage container 302 (the effective volume is the volume in which urea is contained). Increasing the pressure within the urea storage container will tend to move the urea back towards and under the boiling temperature of urea. That is, at a given temperature, increasing the pressure of urea will lower its boiling point. The purposes of the action at block 412, therefore, is to move the urea back to a liquid state by applying greater pressure within the urea storage container, instead of reducing the urea temperature, when the urea storage container is able to withstand a greater degree of internal pressure. After block 412, the process returns to block 402.

At block 410, if the pressure within the urea storage container 302 is above the first designated pressure (e.g., maximum critical pressure), this may mean that the urea storage container is unable to accommodate additional internal pressure, within safety margins. In this case, the process continues at block 413. Here, the control system 78 controls the urea cooling system 316 for cooling the urea 304. The urea cooling system 316 may be, for example, a solid-state or refrigerantbased cooling device, water or other coolant-circulating pipes (e.g., from the vehicle engine cooling system), or the like. The process returns to block 402.

Meanwhile, back at block 404, if the current temperature of the urea 304 is below the first designated temperature (e.g., freezing point), the processes continues at block 408, where the control system 78 assesses whether the pressure within the urea storage container 302 is greater than one atmosphere. If not (i.e., the pressure is below one atmosphere), the process continues at block A. If so (i.e., the pressure is above one atmosphere), the process continues at block 414, where the control system 78 controls the pressure actuating device 318 to reduce the pressure within the urea storage container 302 to one atmosphere or thereabouts. From block 414, the process returns to block 402. As should be appreciated, if the temperature is below the freezing point of urea at one atmosphere, as at block 404, but the pressure is actually above one atmosphere, as at block 408, this may mean that the urea is in a liquid stage, i.e., the pressure is too high for solid urea at that temperature. When the process returns to block 402, after the pressure is reduced to one atmosphere at block 414, the current temperature of the urea is in-effect reassessed to determine if it is still below the freezing point, in which case heating is required.

If the urea temperature is below the first designated temperature (e.g., freezing point at one atmosphere), as at block 404, and the pressure within the urea storage container is at or below one atmosphere (block 408), this indicates that the urea may be in solid form, and the process continues, via block A, to block 416 in FIG. 9B, for heating the urea. FIG. 9B, starting at block A, summarizes the process for heating the urea, under conditions (as outlined in FIG. 9A) where it is determined to do so. At block 416, the control system 78 determines if dynamic braking of the vehicle is in progress. If so, the process continues at block 418. Here, at block 418, electricity from the dynamic braking process is used to power the urea storage container heating unit 306, e.g., the heaters 306*a*, 306*b*, for heating the heat retaining material 308. If not, the process continues at block 420. Here, at block 420, the control system 78 determines if the temperature of the heat retaining material is within working limits. (Such information may be provided from a temperature sensor, not shown, operably connected to the pan or other container 324.) If so, heat from the heat retaining material is used to heat the urea 304, at block 422. That is, the heat retaining material is still hot enough, within the working limits, to provide a desired/sufficient level of heat to the urea. From block 422, the process returns to block 402 (FIG. 9A). Back at block 420, if the temperature of the heat retaining material is not within working limits, e.g., it is too cool to provide sufficient heat to the urea 304, the process continues at block 424. Here, electricity from the energy device 34 (e.g., energy storage device 82) is used to power the urea storage container heating unit 306, for heating the urea directly and/or for heating the heat retaining material. That is, since dynamic braking is not in progress (block 416), but the heat retaining material is not sufficiently hot to heat the urea to a desired level (block 420), the system uses electrical power from the energy device on board the vehicle to power the urea storage container heating unit 306. The control system 78 may additionally set a flag to "remind" itself to further power the urea storage container heating unit 306 using dynamic braking electricity, when such dynamic braking electricity again becomes available. From block 424, the process continues back at block 402 (FIG. 9A).

In an embodiment, the control system 78 monitors the respective temperatures of urea within the urea storage container and the heat retaining material. Once the temperature of the urea goes beyond (below or above) its working level, the control system initially varies the pressure within the urea storage container, by activating the pressure actuating device. If changing the pressure is insufficient to bring the urea to within its working level (e.g., a liquid condition), the heat retaining material is used to raise the temperature of the urea, if the temperature of the heat retaining material is greater than the temperature of the urea. Subsequently, dynamic braking energy will be utilized for heating. For doing so, a window of the urea's working level is set based on temperatures and pressures. If the urea's temperature is within the window as a function of pressure, a signal is sent to the control system to divert part of the dynamic braking energy to the urea storage container and heat retaining material. If dynamic braking energy is not available or sufficient, electrical energy from an energy device (e.g., energy storage device) may be used. The upper and lower limits of the window are set depending on the freezing and boiling point of the urea, and at each pressure. Actually, the boiling and freezing points of urea will vary depending on the pressure surrounding it. By varying the pressure (e.g., the force acting on the urea), it is possible to vary its boiling point and freezing point.

In an embodiment, the control system 78 is configured to determine a control strategy exhibiting the minimum energy required to avoid boiling or freezing of urea. For example, raising the temperature only might consume more heat energy, hence the boiling point is moved up by adjusting the pressure, if that is economical, or it might be combination of pressure and temperature to avoid boiling or freezing.

In an embodiment, the urea storage container heating unit 306 comprises only a heater 306*b* positioned in or proximate to urea 304 in the storage tank or other container 302. ("Proximate to" means that the heater 306*b* can transfer heat directly to the urea 304 or direct from the heater 306*b* to the urea 304 through the wall of the container 302.)

Any of the embodiments described herein are applicable for use in a railroad locomotive.

In any of the embodiments herein, the pan or other container for holding the heat retaining material may be mechanically coupled to a device (e.g., servo or other actuator; guidance tracks) that allows the pan or other container to be selectively brought into contact with the urea storage container, under control of the control system 78. This would allow for a greater degree of control over what amount of heat energy is applied from the heat retaining material to the urea storage container.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for operating an auxiliary system in an off-highway vehicle, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for operating an auxiliary system in an off-highway vehicle, the method comprising:
    dynamically braking the vehicle so as to generate dynamic braking electricity using a traction motor of the vehicle;
    powering at least one auxiliary system in the vehicle with the dynamic braking electricity;
    to the extent the dynamic braking electricity is insufficient to power the at least one auxiliary system, and when dynamic braking electricity is unavailable, powering the at least one auxiliary system from an energy device in the vehicle; and
    to the extent the dynamic braking electricity exceeds electrical power requirements of the at least one auxiliary system, dispersing the dynamic braking electricity in a dynamic braking resistive grid.

2. The method of claim 1 wherein:
    the off-highway vehicle includes an engine emissions treatment system having a urea storage container that contains urea;
    the at least one auxiliary system comprises a urea storage container heating unit in thermal communication with a heat retaining material located proximate to the urea storage container; and
    the urea storage container heating unit is powered with the dynamic braking electricity to heat the heat retaining material.

3. The method of claim 2 further comprising varying a pressure within the urea storage container to maintain the urea in a liquid state.

4. The method of claim 1 wherein:
    the off-highway vehicle includes a particulate filter disposed in fluid communication with an exhaust path of an engine of the vehicle, for filtering particulate matter from an exhaust gas flow of the engine;
    the at least one auxiliary system comprises a particulate filter regeneration heating unit positioned in the exhaust path; and
    the particulate filter regeneration heating unit is powered with the dynamic braking electricity to heat the exhaust gas flow to a temperature sufficient to cause oxidation of particulate matter contained in the particulate filter.

5. The method of claim 1 wherein heating of the exhaust gas flow by the particulate filter regeneration heating unit is selectively carried out as a function of a pressure differential measured across an inlet and an outlet of the particulate filter, wherein the exhaust gas is heated whenever the pressure differential is greater than a preselected upper limit, and wherein the exhaust gas is not heated whenever the pressure differential is lower than a preselected lower limit.

6. The method of claim 1 wherein the energy device is an energy storage device.

7. The method of claim 6 wherein the energy storage device is an auxiliary energy storage device.

8. A method for operating an auxiliary system in an off-highway vehicle, the method comprising:
    dynamically braking the vehicle so as to generate dynamic braking electricity using a traction motor of the vehicle;
    powering a particulate filter regeneration heating unit in the vehicle with the dynamic braking electricity, wherein the off-highway vehicle includes a particulate filter disposed in fluid communication with an exhaust path of an engine of the vehicle, for filtering particulate matter from an exhaust gas flow of the engine, and wherein the particulate filter regeneration heating unit is powered to heat an exhaust gas flow passing from the engine into the particulate filter to a temperature sufficient to cause oxidation of particulates contained in the particulate filter;
    to the extent the dynamic braking electricity is insufficient to power the particulate filter regeneration heating unit, and when dynamic braking electricity is unavailable, powering the particulate filter regeneration heating unit from an energy device in the vehicle; and
    to the extent the dynamic braking electricity exceeds electrical power requirements of the particulate filter regeneration heating unit, dispersing the dynamic braking electricity in a dynamic braking resistive grid.

9. The method of claim 8 wherein heating of the exhaust gas flow by the particulate filter regeneration heating unit is selectively carried out as a function of a pressure differential measured across an inlet and an outlet of the particulate filter, wherein the exhaust gas is heated whenever the pressure differential is greater than a preselected upper limit, and wherein the exhaust gas is not heated whenever the pressure differential is lower than a preselected lower limit.

10. The method of claim 8 wherein the energy device is an energy storage device.

11. The method of claim 10 wherein the energy storage device is an auxiliary energy storage device.

12. A method for operating an auxiliary system in an off-highway vehicle, the method comprising:
dynamically braking the vehicle so as to generate dynamic braking electricity using a traction motor of the vehicle; and
powering a urea storage container heating unit in the vehicle with the dynamic braking electricity; wherein:
the off-highway vehicle includes an engine emissions treatment system having a urea storage container that contains urea;
the urea storage container heating unit is in thermal communication with a heat retaining material located proximate to the urea storage container; and
the urea storage container heating unit is powered with the dynamic braking electricity to heat the heat retaining material.

13. The method of claim 12 further comprising varying a pressure within the urea storage container to maintain the urea in a liquid state.

14. The method of claim 2 further comprising providing a reminder to use the dynamic braking energy to heat the heat retaining material located proximate to the urea storage container when the heat retaining material temperature is not within working limits and when the dynamic braking energy is available.

15. A method for operating an auxiliary system in an off-highway vehicle, the method comprising:
dynamically braking the vehicle so as to generate dynamic braking electricity using a traction motor of the vehicle;
powering at least one auxiliary system in the vehicle with the dynamic braking electricity;
to the extent the dynamic braking electricity is insufficient to power the at least one auxiliary system, and when dynamic braking electricity is unavailable, powering the at least one auxiliary system from an energy device in the vehicle; and
to the extent the dynamic braking electricity exceeds electrical power requirements of the at least one auxiliary system, dispersing the dynamic braking electricity in a dynamic braking resistive grid;
wherein the off-highway vehicle includes an engine emissions treatment system having a urea storage container that contains urea;
the at least one auxiliary system comprises a urea storage container heating unit in thermal communication with a heat retaining material located proximate to the urea storage container; and
the urea storage container heating unit is powered with the dynamic braking electricity to heat the heat retaining material.

16. The method of claim 15 further comprising varying a pressure within the urea storage container to maintain the urea in a liquid state.

* * * * *